(12) United States Patent
Lucas et al.

(10) Patent No.: US 11,925,873 B1
(45) Date of Patent: Mar. 12, 2024

(54) TELEMETRIC VIDEO PROCESSING

(71) Applicant: Electronic Arts Inc., Redwood City, CA (US)

(72) Inventors: Alexander Lucas, Edmonton (CA); Mike Kriz, Canmore (CA); Nathan Frederick, Edmonton (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/833,484

(22) Filed: Jun. 6, 2022

Related U.S. Application Data

(63) Continuation of application No. 17/006,598, filed on Aug. 28, 2020, now Pat. No. 11,369,885.

(51) Int. Cl.
*A63F 13/86* (2014.01)
*A63F 13/537* (2014.01)
*G06F 18/21* (2023.01)
*G06F 18/22* (2023.01)
*G06V 20/40* (2022.01)
*H04N 19/42* (2014.01)

(52) U.S. Cl.
CPC ............ *A63F 13/86* (2014.09); *A63F 13/537* (2014.09); *G06F 18/217* (2023.01); *G06F 18/22* (2023.01); *G06V 20/41* (2022.01); *G06V 20/46* (2022.01); *H04N 19/42* (2014.11)

(58) Field of Classification Search
CPC ....................................................... A63F 13/86
See application file for complete search history.

(56) References Cited

U.S. PATENT DOCUMENTS

| | | | |
|---|---|---|---|
| 10,449,461 B1 * | 10/2019 | Verma | ..................... A63F 13/86 |
| 11,154,773 B2 | 10/2021 | White et al. | |
| 2019/0258671 A1 | 8/2019 | Bou et al. | |
| 2020/0175303 A1 | 6/2020 | Bhat et al. | |
| 2020/0193163 A1 * | 6/2020 | Chang | ................ H04N 21/4662 |
| 2021/0086089 A1 * | 3/2021 | Pardeshi | .................. G06N 3/02 |

* cited by examiner

*Primary Examiner* — Reginald A Renwick
(74) *Attorney, Agent, or Firm* — McDermott Will & Emery LLP

(57) ABSTRACT

Various aspects of the subject technology relate to systems, methods, and machine-readable media for extracting information from videos. The method includes annotating portions of interest within screen captures. The method also includes receiving at least a first set of videos for a video game. The method also includes training a first machine-learning model to identify the portions of interest within the first set of videos. The method also includes generating validation data based on results of the first machine-learning model. The method also includes extracting information based on the portions of interest identified in the first set of videos.

16 Claims, 11 Drawing Sheets

TELEMETRIC VIDEO PROCESSING

CROSS-REFERENCE TO RELATED APPLICATIONS

This present application claims the benefit of priority under 35 U.S.C. 120 as a continuation of U.S. patent application Ser. No. 17/006,598, filed Aug. 28, 2020, now allowed, the disclosures of which are hereby incorporated by reference in their entirety for all purposes.

TECHNICAL FIELD

The present disclosure generally relates to video games, and more particularly to telemetric video processing.

BACKGROUND

Video games are a popular way of interacting with other people and are enjoyable to play. Video games come in a wide variety of genres, including sports, action, first-person shooter, puzzles, etc. Video game producers typically focus on producing games that are enjoyable to a wide audience. However, it is difficult to determine how players will react to a video game prior to its release.

BRIEF SUMMARY

The subject disclosure provides for systems and methods for telemetric video processing. In an aspect, screen captures of video games are annotated for detectable elements. The annotated screen captures may be utilized to create training data and validation data sets for a preliminary machine-learning model. The preliminary machine-learning model may be utilized to source additional training data and validation data sets. The additional training data and validation data sets may be utilized for creating an advanced machine-learning model. Videos may be sourced as inputs to the advanced machine-learning model. The advanced machine-learning model may output extracted data from the videos. The extracted data may be analyzed and utilized to improve a video game.

According to one embodiment of the present disclosure, a computer-implemented method for extracting information from videos is provided. The method includes annotating portions of interest within screen captures. The method also includes receiving at least a first set of videos for a video game. The method also includes training a first machine-learning model to identify the portions of interest within the first set of videos. The method also includes generating validation data based on results of the first machine-learning model. The method also includes extracting information based on the portions of interest identified in the first set of videos.

According to one embodiment of the present disclosure, a system is provided including a processor and a memory comprising instructions stored thereon, which when executed by the processor, causes the processor to perform a method for extracting information from videos. The method includes annotating portions of interest within screen captures. The method also includes receiving at least a first set of videos for a video game. The method also includes training a first machine-learning model to identify the portions of interest within the first set of videos. The method also includes generating validation data based on results of the first machine-learning model. The method also includes extracting information based on the portions of interest identified in the first set of videos.

According to one embodiment of the present disclosure, a non-transitory computer-readable storage medium is provided including instructions (e.g., stored sequences of instructions) that, when executed by a processor, cause the processor to perform a method for extracting information from videos. The method includes annotating portions of interest within screen captures. The method also includes receiving at least a first set of videos for a video game. The method also includes training a first machine-learning model to identify the portions of interest within the first set of videos. The method also includes generating validation data based on results of the first machine-learning model. The method also includes extracting information based on the portions of interest identified in the first set of videos.

According to one embodiment of the present disclosure, a system is provided that includes means for storing instructions, and means for executing the stored instructions that, when executed by the means, cause the means to perform a method for extracting information from videos. The method includes annotating portions of interest within screen captures. The method also includes receiving at least a first set of videos for a video game. The method also includes training a first machine-learning model to identify the portions of interest within the first set of videos. The method also includes generating validation data based on results of the first machine-learning model. The method also includes extracting information based on the portions of interest identified in the first set of videos.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
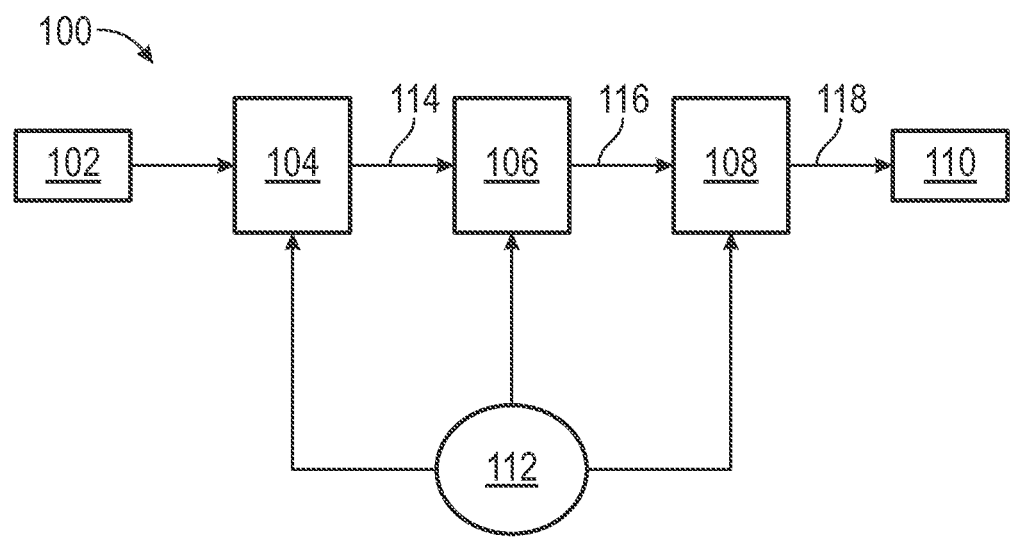
FIG. 1 illustrates an exemplary system for extracting information from videos, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Video games are a popular way of interacting with other people and are enjoyable to play. Video games come in a wide variety of genres, including sports, action, first-person shooter, puzzles, etc. Video game producers often compete against each other to produce games that are enjoyable to a wide audience. However, it is difficult to determine how players will react to a video game prior to release.

Conventionally, video games may be instrumented to provide data to video game producers regarding various aspects of gameplay. Additionally, player feedback and reviews may be another source of input of how satisfactory a video game is to players. However, instrumentation of video games may be insufficient because not all video games may be instrumented consistently and at a high quality. Additionally, instrumentation only applies to a video game producer's own products. Furthermore, player feedback and reviews are from a limited audience, and may not apply to all players. Oftentimes, criticism of a video game surfaces only after the video game has been released. Therefore, there is a need for improved extraction of information from video games that overcomes the aforementioned challenges in order to produce better video games.

Aspects of the present disclosure address these issues by providing for systems and methods for telemetric video processing. In an aspect, screen captures of video games are annotated for detectable elements. The annotated screen captures may be utilized to create training data and validation data sets for a preliminary machine-learning model. The preliminary machine-learning model may be utilized to source additional training data and validation data sets. The additional training data and validation data sets may be utilized for creating an advanced machine-learning model. Videos may be sourced as inputs to the advanced machine-learning model. The advanced machine-learning model may output extracted data from the videos. The extracted data may be analyzed and utilized to improve a video game.

The disclosed system addresses a problem in traditional video game production tied to computer technology, namely, the technical problem of producing video games that are functional (e.g., devoid of bugs, glitches, errors, etc.) while also being enjoyable to play. The disclosed system solves this technical problem by providing a solution also rooted in computer technology, namely, by providing for extracting information from videos. The disclosed system also improves the functioning of the computer itself because it trains the computer to recognize and extract relevant information from videos.

FIG. 1 illustrates an exemplary system 100 for extracting information from videos, according to certain aspects of the present disclosure. The system 100 may include training data 102, a first machine-learning model 104 (e.g., a preliminary model), a second machine-learning model 106 (e.g., an intermediate model), a third machine-learning model 108 (e.g., an advanced model), outputs 110, and a database 112.

According to aspects, training data 102 may be utilized to train the first machine-learning model 104. For example, the training data 102 may include a set of screen captures for a video game. The screen captures may be annotated to identify and highlight portions of interest within each screen capture. For example, the portions of interest may include at least one of a rare item, a player reaction, a player rank, a username, or a custom skin, etc. The portions of interest may be detectable elements that are designated by a highlighted box and may also include comments. The training data 102 may be prepared by a video game administrator.

According to aspects, the first machine-learning model 104 may be trained based on the training data 102 to identify the portions of interest within videos 112 of video games. The first machine-learning model 104 may also receive as input at least a first set of videos 112 in order to identify the portions of interest within the videos 112. For example, the videos 112 may be sourced from focus groups (e.g., video game focus testing groups), internally produced videos (e.g., videos generated by a video game producer), and/or publicly available videos. It is understood that the videos 112 are and used captured as allowed by privacy policies, laws, etc., and/or as permitted by players. In an implementation, the videos 112 may be sourced from various publicly accessible databases and/or from a private database storing internally produced videos and videos from focus groups.

According to aspects, the first machine-learning model 104 may output validation data 114 that may be utilized to train the second machine-learning model 106 to identify the portions of interest. For example, the validation data 114 may include the portions of interest identified by the first machine-learning model 104. The validation data 114 may also include administrator annotated screen captures of a subset of the videos 112. This is because in some cases the first machine-learning model 104 may have incorrectly identified and/or missed some of the portions of interest. The administrator annotated screen captures would rectify these mistakes so that they are not propagated onto the second machine-learning model 106.

In an implementation, the second machine-learning model 106 may also receive as input a second set of videos 112 in order to identify the portions of interest within the videos 112. According to aspects, the second set of videos may be greater than the first set of videos. For example, the second set of videos may be twice to ten times as large as the first set of videos. This is because the second machine-learning model 106 would have a higher degree of accuracy than the first machine-learning model 104, having been trained on more data than the first machine-learning model 104. In an implementation, additional training and validation data may be generated by the second machine-learning model 106, which may then be utilized to train the third machine-learning model 108.

According to aspects, the second machine-learning model 106 may output test data 116 that may be utilized to train the third machine-learning model 108 to identify the portions of interest. For example, the third machine-learning model 108 may receive as input a third set of videos 112. The third set of videos may be twice to ten times as large as the second set of videos. For example, the third set of videos may include thousands of hours of videos. The third machine-learning model 108 may output video game data 118 that includes the portions of interest identified in the videos 112.

It is understood that one or more sets of videos (e.g., at least one set of videos) may be utilized as inputs into the above-described machine-learning models 104, 106, 108. For example, only the first set of videos may be utilized as inputs into the machine-learning models 104, 106, 108. Furthermore, the second set of videos, the third set of videos, and/or more sets of videos, may optionally be utilized as inputs into one or more machine-learning models, pursuant to the above.

In an implementation, an analyzer 110 may receive the video game data 118 to perform extract, transform, load (ETL) analysis on the video game data 118. For example, the ETL analysis may derive specific features of the video games based on the identified portions of interest within the videos 112. According to an aspect, drop rates of rare items, rank progression rates, levelling curves, player progression, and more may be derived by the analyzer 110 based on the video game data 118.

According to aspects, the three machine-learning models may be integrated as one single machine-learning model that improves with each set of generated training and validation data.

As described above, the system 100 provides improvements to conventional methods for analyzing video games because the system 100 is able analyze thousands of hours of gameplay quickly. This is partially because the videos 112 do not need to be played through in real-time. Rather, data of the videos 112 is analyzed as quickly as a processor is able to process the video data. Additionally, the videos 112 may be compressed and/or filtered to improve identification of portions of interest. Conventional methods are time consuming because either a player is required to personally play through an entire game and/or an administrator must watch thousands of hours, both of which become burdensome for people. As a result, the system 100 improves efficiency and effectiveness of video analysis by leveraging the power of machine-learning.

Figure 2A:
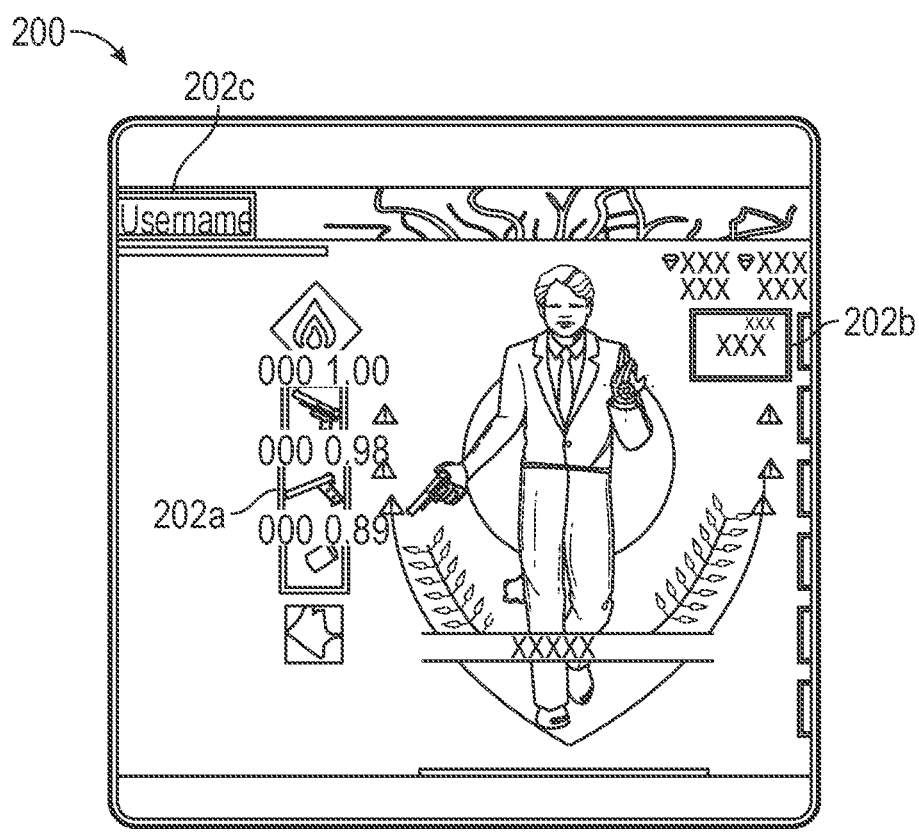
FIGS. 2A-2D illustrates exemplary annotations to videos, according to certain aspects of the present disclosure.

FIGS. 2A-2D illustrates exemplary annotations to videos, according to certain aspects of the present disclosure. Referring to FIG. 2A, a player home screen 200 is displayed. As illustrated, several portions of interest 202 have been highlighted in colored boxes. The portions of interest 202 may be marked by a video game administrator (e.g., a video game producer). In an implementation, the portions of interest 202 may be marked based on a desired goal of the video game administrator. For example, a goal may be to track an inventory of the player, in which case the inventory 202a of the player may be highlighted. Another goal may be to track a progress of the player, in which case a player ranking and/or player attributes 202b may be highlighted. Furthermore, other on-screen information may be highlighted, such as a player username 202c, in order to track and/or identify a specific player.

According to aspects, the portions of interest 202 may be highlighted based on specific goal and/or an order of importance. For example, the username 202c may have a higher order of importance than the inventory 202a. It is understood that the order of importance may change based on the goal of the video game administrator. For example, in some aspects, the inventory 202a may receive a highest order of importance, such as if the player has rare items. In this way, the portions of interest may be customized based on various goals. According to aspects, the order of interest may be denoted by different color highlighting of the boxes. For example, yellow may denote a lowest order of importance, blue an intermediate order of importance, and purple a highest order of importance. It is understood that these are exemplary only, and additional colors may be included as well. Furthermore, the portions of interest 202 may be designated in other ways as well. For example, instead of highlighted boxes, the portions of interest 202 may be identified by other shapes and/or other styles of designations (e.g., patterned outlines, etc.).

Figure 2B:
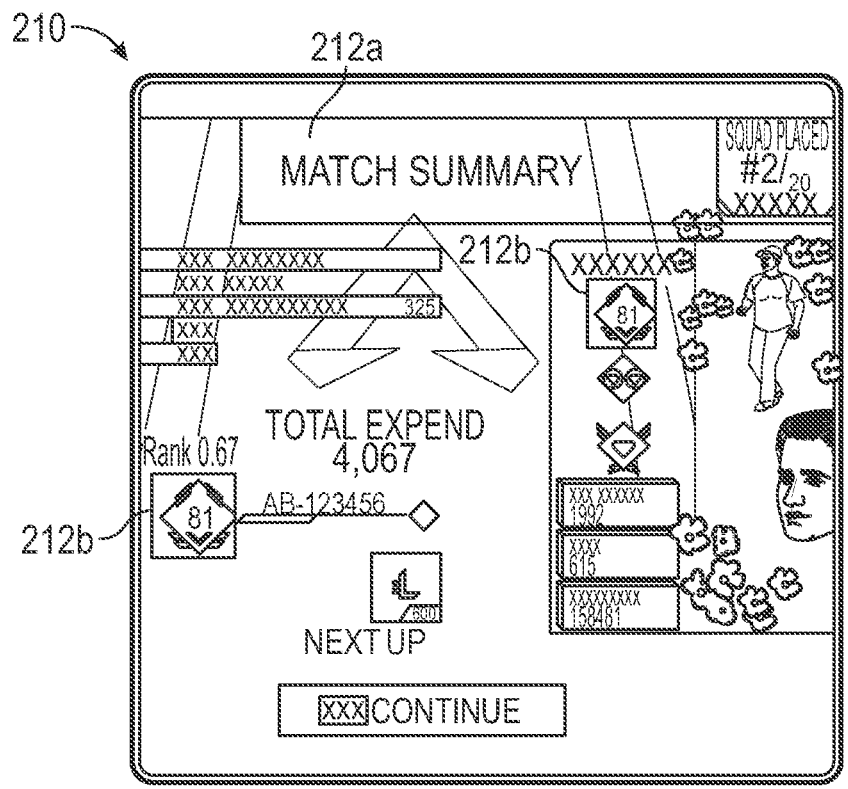

Referring to FIG. 2B, a match summary screen 210 is illustrated. As shown, portions of interest 212 relating to squad placement 212a and player rank 212b have been highlighted. Based on these highlighted portions of interest 212, it may be concluded that a goal of a video game administrator in this case is to track player progress and ranking for the video game. It is also noted that the player rank 212b appears twice in the summary screen 210, and so it has been highlighted twice. It is understood that other portions of the summary screen 210 may also be highlighted based on other goals.

Figure 2C:
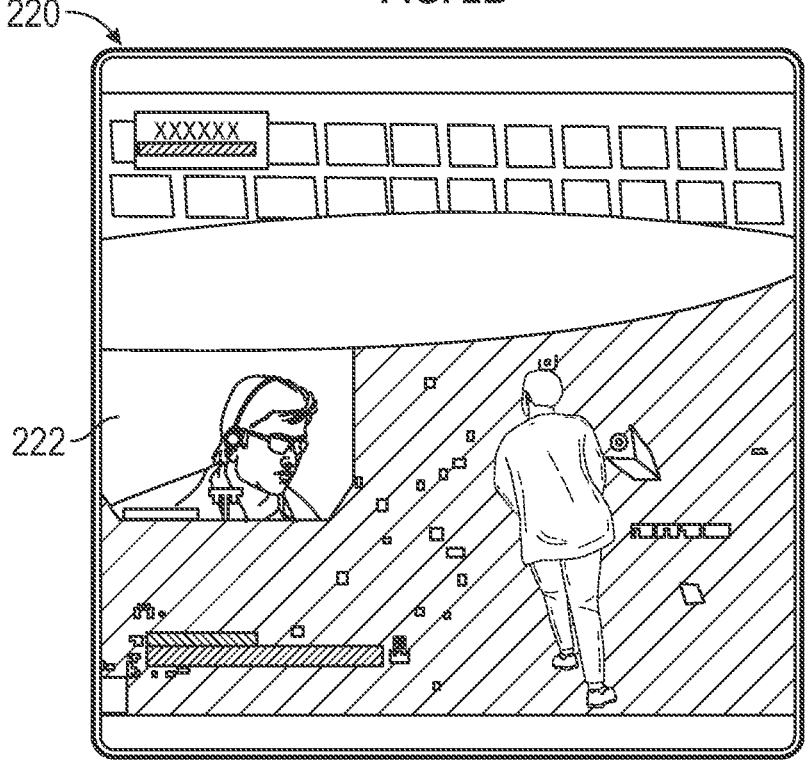

Referring to FIG. 2C, an in-game screenshot 220 is illustrated. For example, some videos may include videos of the players themselves. In such cases, the player 222 may be highlighted as a portion of interest in order to gauge a level of engagement of the player 222. For example, if the player 222 is engaged, then it may be concluded that the video game has achieved its desired effect. Similarly, if the player 222 appears not engaged, then the video game may need to be improved to increase engagement. As shown in FIG. 2C, the player 222 appears to be engaged in what is occurring on-screen 220. According to aspects, facial recognition technology may be utilized by the analyzer 110 to interpret player engagement.

Figure 2D:
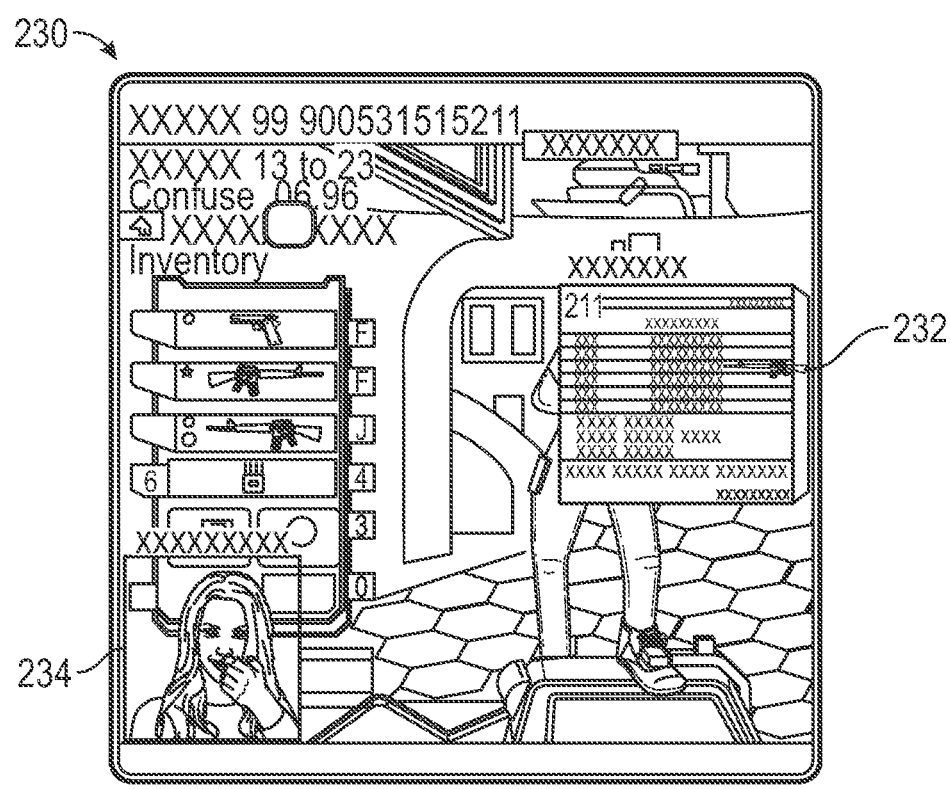

Referring to FIG. 2D, an inventory screen 230 is illustrated. For example, the inventory screen 230 may display loot 232 obtained by a player 234. The loot 232 may be highlighted in order to show what items were gained by the player 234. A reaction of the player 234 may be analyzed in order to determine whether the loot 232 elicited a specific response from the player 234. For example, it appears that the player 234 is engaged based on the acquired loot 232. In this way, adjustments to the way inventory is displayed may be improved or adjusted based on player engagement.

It is understood that FIGS. 2A-2D may be related to the same video game, or to different video games of similar or different genres. It is further understood that the screen captures 200, 210, 220, 230 may be examples of training data 102, validation data 114, test data 116, and/or video game data 118, as described above in FIG. 1. For example, the annotations 202, 212, 222, 232, 234 may be user generated or generated by the machine-learning models 104, 106, 108.

Figure 3A:
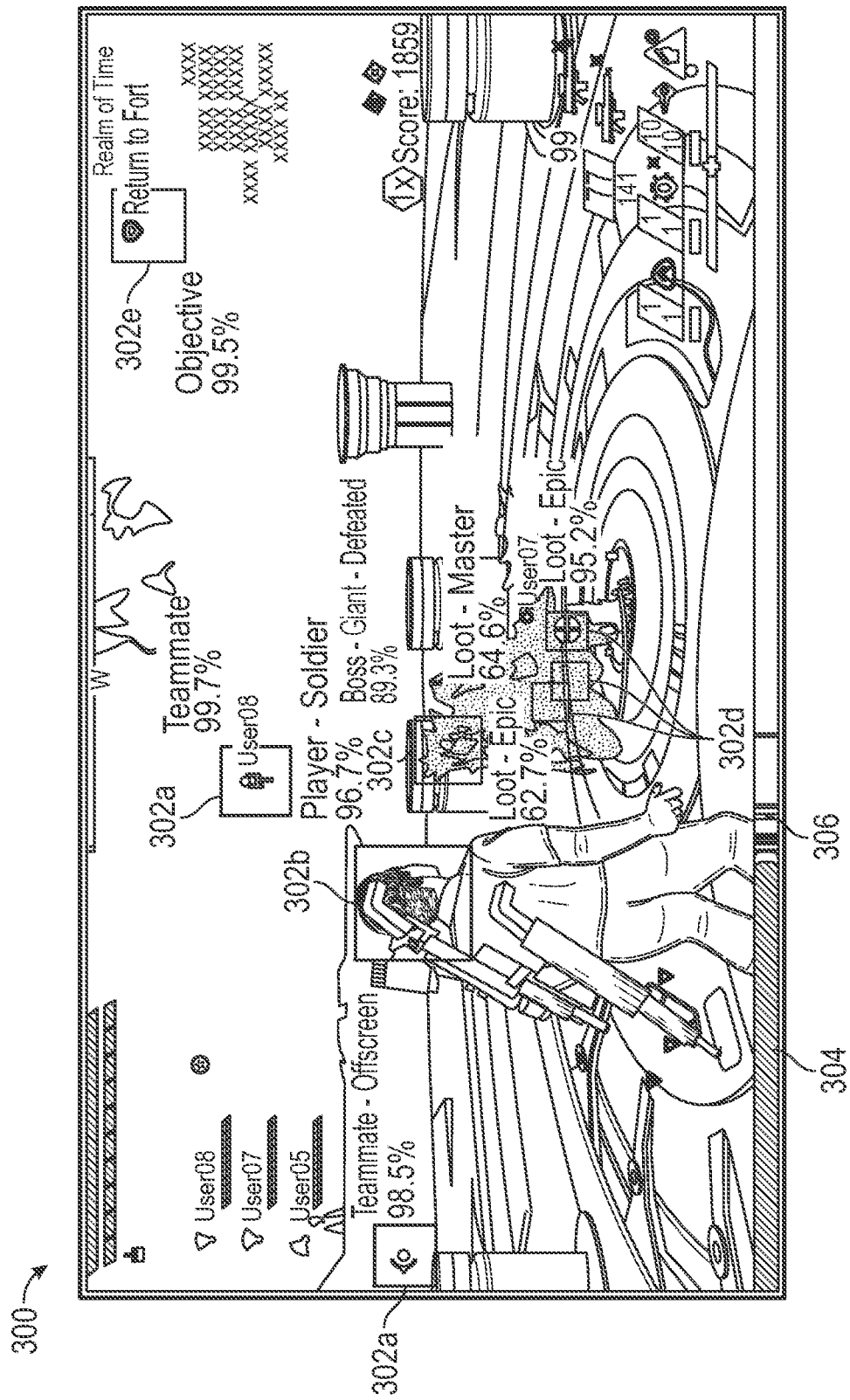
FIGS. 3A and 3B illustrates additional exemplary annotations to videos, according to certain aspects of the present disclosure.
Figure 3B:
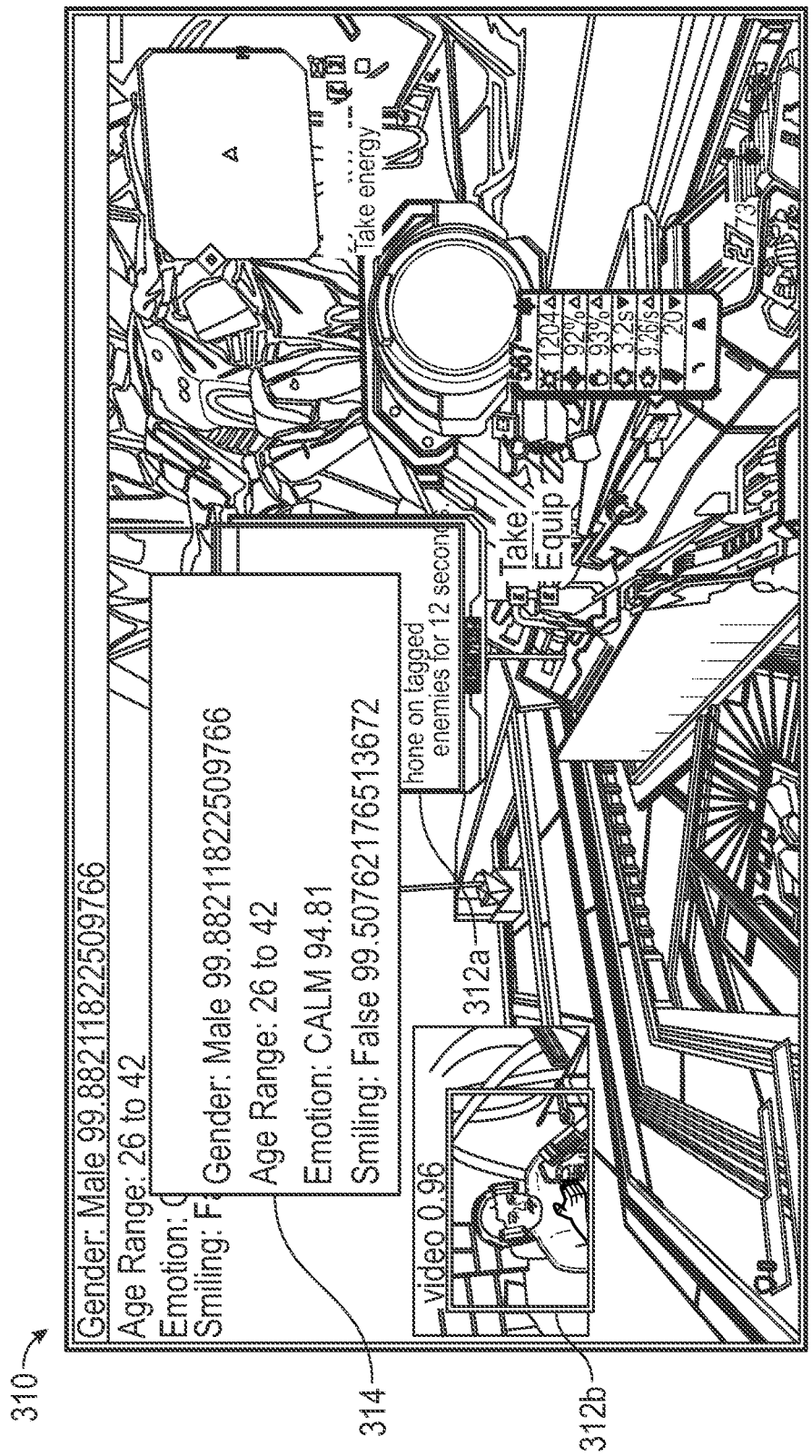

FIGS. 3A and 3B illustrates additional exemplary annotations to videos, according to certain aspects of the present disclosure. Referring to FIG. 3A, a screenshot 300 is illustrated that includes various annotations 302. For example, the annotations 302 may be for various on-screen information, including, but not limited to, teammates 302a, a player 302b, a boss 302c, loot 302d, and/or an objective 302e. The annotations 302 may also include a probability percentage that reflects an anticipated accuracy of each annotation 302. For example, based on the annotation 302 for the player 302b, it is 96.7% likely that the player has been correctly identified. Similarly, it is 99.5% likely that the objective 302e is to "Return to the Fort."

According to aspects, the annotations may include additional information regarding each portion of interest. For example, the player 302b is a "Soldier", a name and a status of the boss 302c is "Giant—Defeated", and categories of the loot 302d include "Master", and "Epic." It is understood that various other portions of the screen capture 300 may be similarly identified and annotated based on a desired goal of a video game administrator. In the case at hand, the goal may be to identify a rate of loot 302d dropped by defeating a certain boss 302c and/or achieving an objective 302e.

According to additional aspects, the screen capture 300 may include a progress bar 304 that illustrates portions in a video (e.g., videos 112) that include annotations 306. For example, the progress bar 304 illustrates that the video is less than half over, and several annotations 306 remain in the rest of the video. This feature may aid in analyzing the video game data 118 so that annotations 306 are not overlooked. Additionally, this feature may be useful in identifying unique fingerprints for each video, which may be utilized for debugging and/or during video game development. For example, during development of a video game, it may be useful to know what version of the video game is being debugged. The progress bar 304 may illustrate portions of video that relate to different versions of the game, thus providing a unique fingerprint for each version.

Referring to FIG. 3B, a screen capture of a first-person shooter 310 is illustrated. For example, portions of interest 312 regarding acquired loot 312a and a player 312b have been highlighted. Additionally, an annotation 314 regarding analysis of the player 312b may be included. For example, the annotation 314 may be generated based on facial recognition technology by either the analyzer 118 or the machine-learning models 104, 106, 108.

As illustrated, the annotation 314 includes information that the player 312b is male (e.g., to at least 99.882 degrees of accuracy), has an age range from 26 to 42 years old, has a calm emotion (e.g., to at least 94.81 degrees of accuracy), and that he is not smiling (e.g., to at least 99.5076 degrees of accuracy). In fact, the player 312b does not appear to even be paying attention to the game, even though he may have just acquired a rare item 312a. Based on this analysis, it may be determined that the video game mechanics may be improved to alert the player 312b of a rare item so that the player 312b may become more engaged and excited, thus improving player enjoyment.

Similar to the above, it is understood that FIGS. 3A and 3B may relate to the same video game, or to different video games of similar or different genres. It is further understood that the screen captures 300, 310 may be examples of training data 102, validation data 114, test data 116, and/or video game data 118, as described above in FIG. 1. For example, the annotations 302, 312, 314 may be user generated or generated by the machine-learning models 104, 106, 108.

Figure 4A:
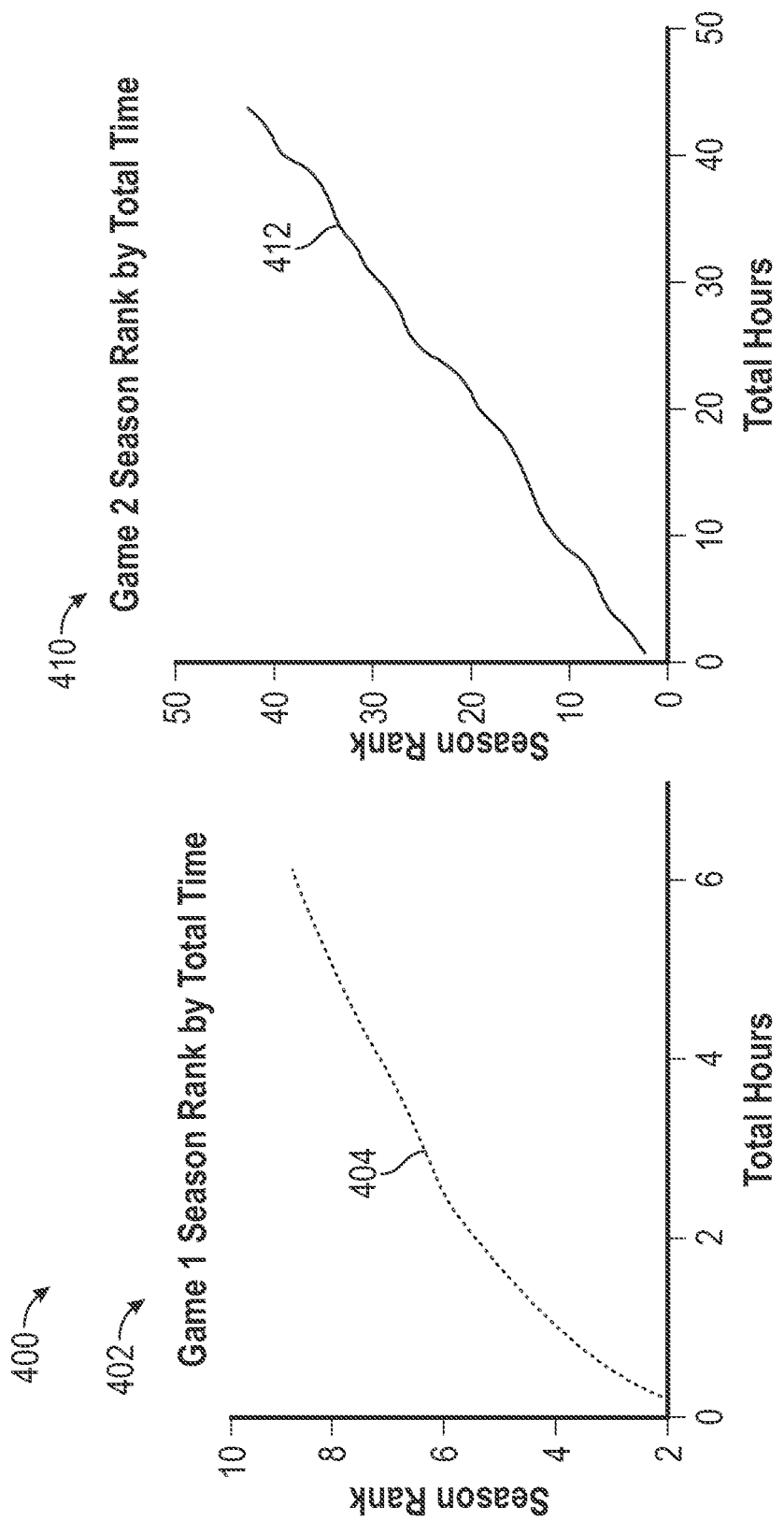
FIGS. 4A-4C illustrates exemplary progression data extracted from videos, according to certain aspects of the present disclosure.
Figure 4B:
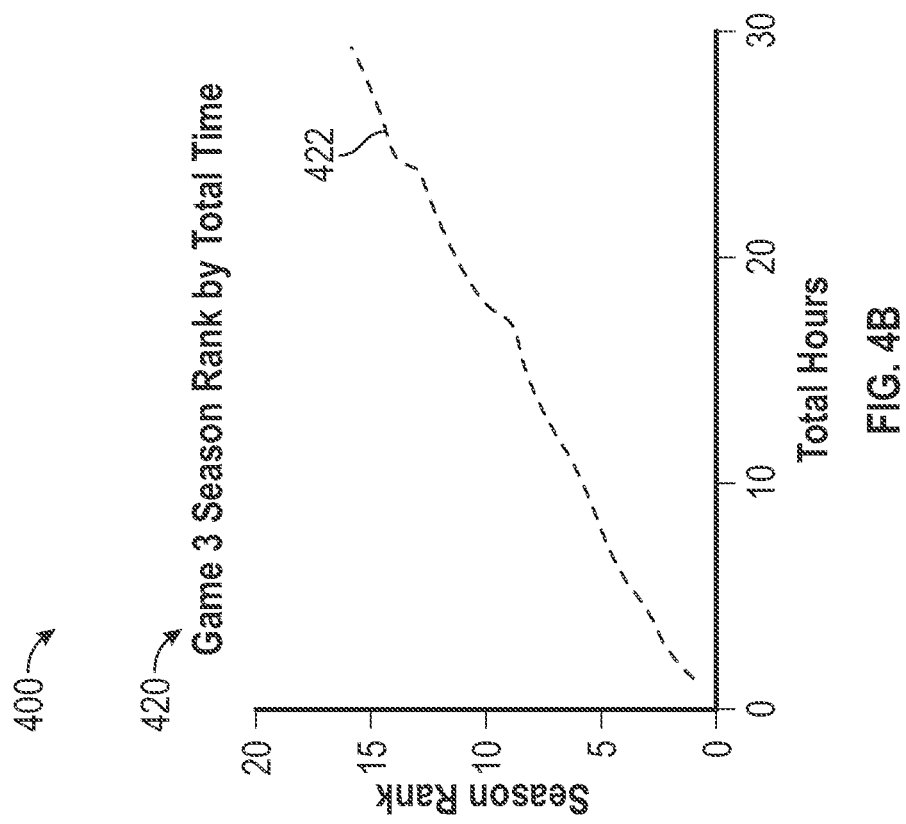
Figure 4C:
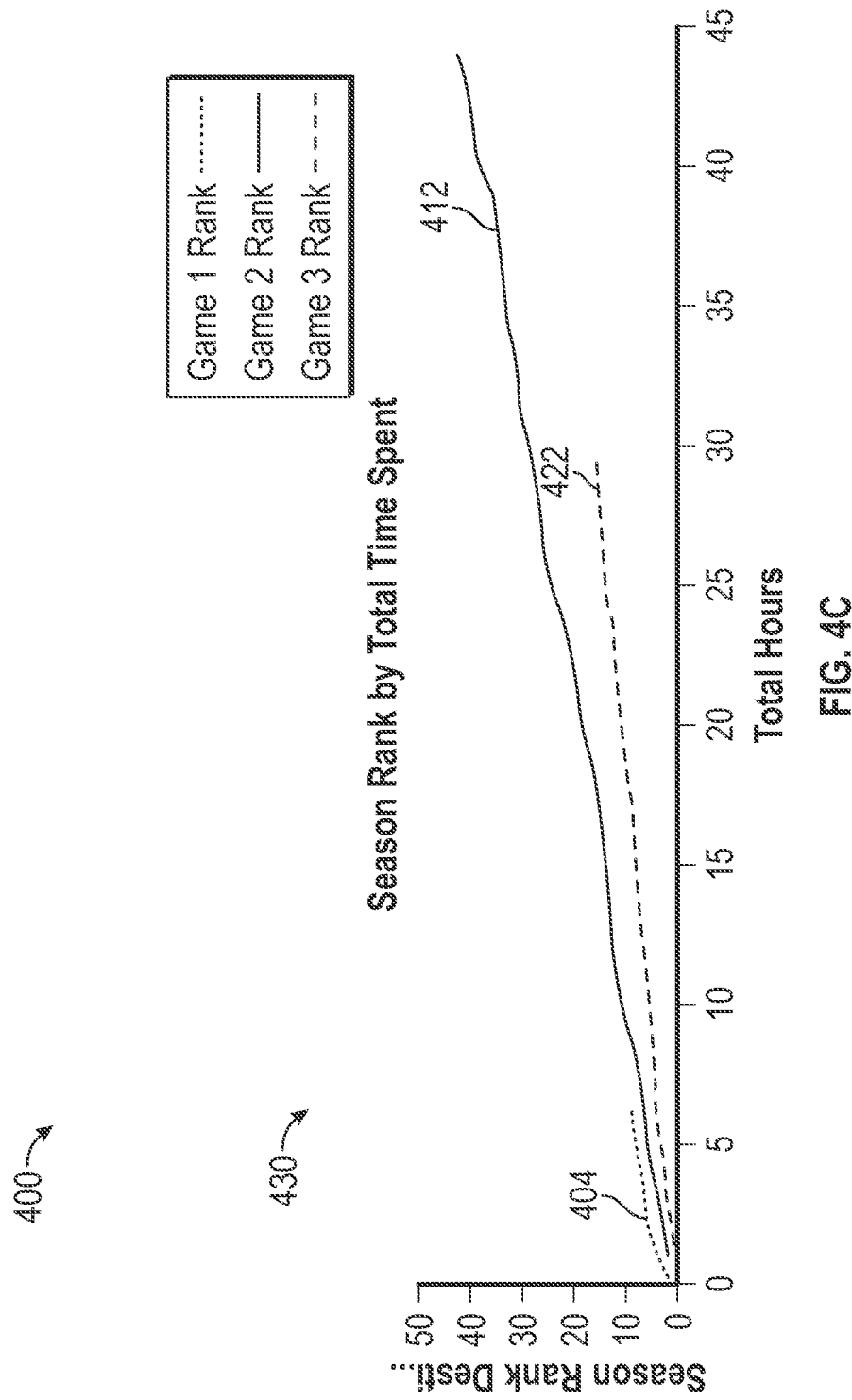

FIGS. 4A-4C illustrates exemplary progression data 400 extracted from videos, according to certain aspects of the present disclosure. As illustrated, the progression data 400 may be generated based on over 15 thousand hours of accelerated gameplay of three similar video games. For example, each of the three video games may be from a similar genre.

According to aspects, a first video game 402 may generate a first curve 404, a second video game 410 may generate a second curve 412, and a third video game 420 may generate a third curve 422. Each of the curves 404, 412, 422 may relate to various goals, including, but not limited to, loot drop rates, levelling curves, player progression, game flow (e.g., load times), etc. For example, each curve 404, 412, 422 may be generated by the analyzer 118, and plotted by goal against total hours spent for each game. In an implementation, the curves show a season ranking by total time spent playing.

According to aspects, the curves 404, 412, 422 may be plotted together in a combined graph 430 to illustrate similarities and/or differences between each of the video games 402, 410, 420. For example, the first game 402 shows a more rapid increase in ranking in less time played than the other two games. Additionally, the second game 410 shows longer playtime and a slightly slower rate of increase in ranking than the first game 402. Finally, the third game 420 shows the slowest rate of increase in ranking. Based on the combined graph 430, it may be concluded that the second game 410 results in the most player enjoyment because of the consistent rate of rank increase and longest playtime. It is understood that other conclusions may be drawn as well.

According to additional aspects, the curves 404, 412, 422 may be generated from the same video game. For example, each curve may illustrate results of different styles of gameplay, which may result in different results.

Figure 5:
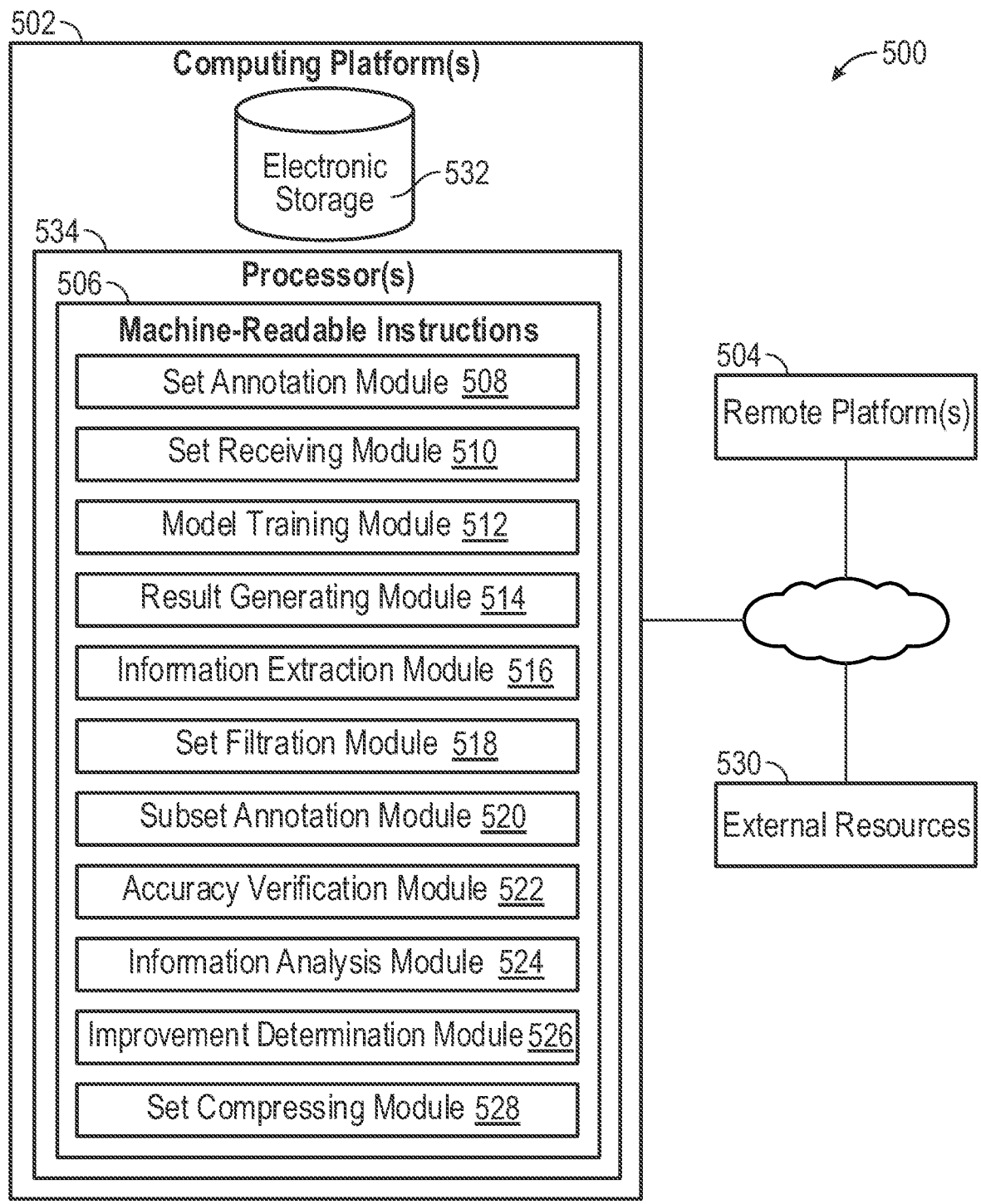
FIG. 5 illustrates a system configured for extracting information from videos, in accordance with one or more implementations.

FIG. 5 illustrates a system 500 configured for extracting information from videos, in accordance with one or more implementations. In some implementations, system 500 may include one or more computing platforms 502. Computing platform(s) 502 may be configured to communicate with one or more remote platforms 504 according to a client/server architecture, a peer-to-peer architecture, and/or other architectures. Remote platform(s) 504 may be configured to communicate with other remote platforms via computing platform(s) 502 and/or according to a client/server architecture, a peer-to-peer architecture, and/or other architectures. Users may access system 500 via remote platform(s) 504.

Computing platform(s) 502 may be configured by machine-readable instructions 506. Machine-readable instructions 506 may include one or more instruction modules. The instruction modules may include computer program modules. The instruction modules may include one or more of set annotation module 508, set receiving module 510, model training module 512, result generating module 514, information extraction module 516, set filtration module 518, subset annotation module 520, accuracy verification module 522, information analysis module 524, improvement determination module 526, set compressing module 528, and/or other instruction modules.

Set annotation module 508 may be configured to annotate a set of screen captures for a video game based on portions of interest within each screen capture. By way of non-limiting example, the portions of interest may include at least one of a rare item, a player reaction, a player rank, a username, or a custom skin.

Set receiving module 510 may be configured to receive at least a first set of videos for the video game that include gameplay of the video game generated by a variety of players.

Set receiving module 510 may also be configured to receive a second set of videos for the video game that include gameplay of the video game generated by a variety of players. The second set of videos may be larger than the first set of videos.

Set receiving module 510 may also be configured to receive a third set of videos for the video game that include gameplay of the video game generated by a variety of players. The third set of videos may be larger than the second set of videos.

Model training module 512 may be configured to train a first machine-learning model to identify the portions of interest within the first set of videos based on the set of screen captures that were annotated.

Model training module 512 may also be configured to train a second machine-learning model to identify the portions of interest within at least the first set of videos and/or a second set of videos based on the validation data.

Model training module 512 may also be configured to train a third machine-learning model to identify the portions of interest within at least the first set of videos and/or a third set of videos based on test data.

Result generating module 514 may be configured to generate validation data based on results of the first machine-learning model.

Information extraction module 516 may be configured to extract information based on the portions of interest identified in at least the first set of videos.

Set filtration module 518 may be configured to filter at least the first set of videos.

Subset annotation module 520 may be configured to annotate a subset of at least the first set of videos to identify the portions of interest.

Accuracy verification module 522 may be configured to verify an accuracy of the first machine-learning model by comparing the subset of the first set of videos that were annotated with outputs of the first machine-learning model.

Information analysis module 524 may be configured to analyze the information that was extracted from at least the first set of videos.

Improvement determination module 526 may be configured to determine improvements to the video game based on the information that was analyzed.

Set compressing module 528 may be configured to compress at least the first set of videos.

In some implementations, computing platform(s) 502, remote platform(s) 504, and/or external resources 530 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 502, remote platform(s) 504, and/or external resources 530 may be operatively linked via some other communication media.

A given remote platform 504 may include one or more processors configured to execute computer program modules. The computer program modules may be configured to enable an expert or user associated with the given remote platform 504 to interface with system 500 and/or external resources 530, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms.

External resources 530 may include sources of information outside of system 500, external entities participating with system 500, and/or other resources. In some implementations, some or all of the functionality attributed herein to external resources 530 may be provided by resources included in system 500.

Computing platform(s) 502 may include electronic storage 532, one or more processors 534, and/or other components. Computing platform(s) 502 may include communication lines, or ports to enable the exchange of information with a network and/or other computing platforms. Illustration of computing platform(s) 502 in FIG. 5 is not intended to be limiting. Computing platform(s) 502 may include a plurality of hardware, software, and/or firmware components operating together to provide the functionality attributed herein to computing platform(s) 502. For example, computing platform(s) 502 may be implemented by a cloud of computing platforms operating together as computing platform(s) 502.

Electronic storage 532 may comprise non-transitory storage media that electronically stores information. The electronic storage media of electronic storage 532 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 532 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 532 may include one or more virtual storage resources (e.g., cloud storage, a virtual private network, and/or other virtual storage resources). Electronic storage 532 may store software algorithms, information determined by processor(s) 534, information received from computing platform(s) 502, information received from remote platform(s) 504, and/or other information that enables computing platform(s) 502 to function as described herein.

Processor(s) 534 may be configured to provide information processing capabilities in computing platform(s) 502. As such, processor(s) 534 may include one or more of a digital processor, an analog processor, a digital circuit designed to process information, an analog circuit designed to process information, a state machine, and/or other mechanisms for electronically processing information. Although processor(s) 534 is shown in FIG. 5 as a single entity, this is for illustrative purposes only. In some implementations, processor(s) 534 may include a plurality of processing units. These processing units may be physically located within the same device, or processor(s) 534 may represent processing functionality of a plurality of devices operating in coordination. Processor(s) 534 may be configured to execute modules 508, 510, 512, 514, 516, 518, 520, 522, 524, 526, and/or 528, and/or other modules. Processor(s) 534 may be configured to execute modules 508, 510, 512, 514, 516, 518, 520, 522, 524, 526, and/or 528, and/or other modules by software; hardware; firmware; some combination of software, hardware, and/or firmware; and/or other mechanisms for configuring processing capabilities on processor(s) 534. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, 518, 520, 522, 524, 526, and/or 528 are illustrated in FIG. 5 as being implemented within a single processing unit, in implementations in which processor(s) 534 includes multiple processing units, one or more of modules 508, 510, 512, 514, 516, 518, 520, 522, 524, 526, and/or 528 may be implemented remotely from the other modules. The description of the functionality provided by the different modules 508, 510, 512, 514, 516, 518, 520, 522, 524, 526, and/or 528 described below is for illustrative purposes, and is not intended to be limiting, as any of modules 508, 510, 512, 514, 516, 518, 520, 522, 524, 526, and/or 528 may provide more or less functionality than is described. For example, one or more of modules 508, 510, 512, 514, 516, 518, 520, 522, 524, 526, and/or 528 may be eliminated, and some or all of its functionality may be provided by other ones of modules 508, 510, 512, 514, 516, 518, 520, 522, 524, 526, and/or 528. As another example, processor(s) 534 may be configured to execute one or more additional modules that may perform some or all of the functionality attributed below to one of modules 508, 510, 512, 514, 516, 518, 520, 522, 524, 526, and/or 528.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
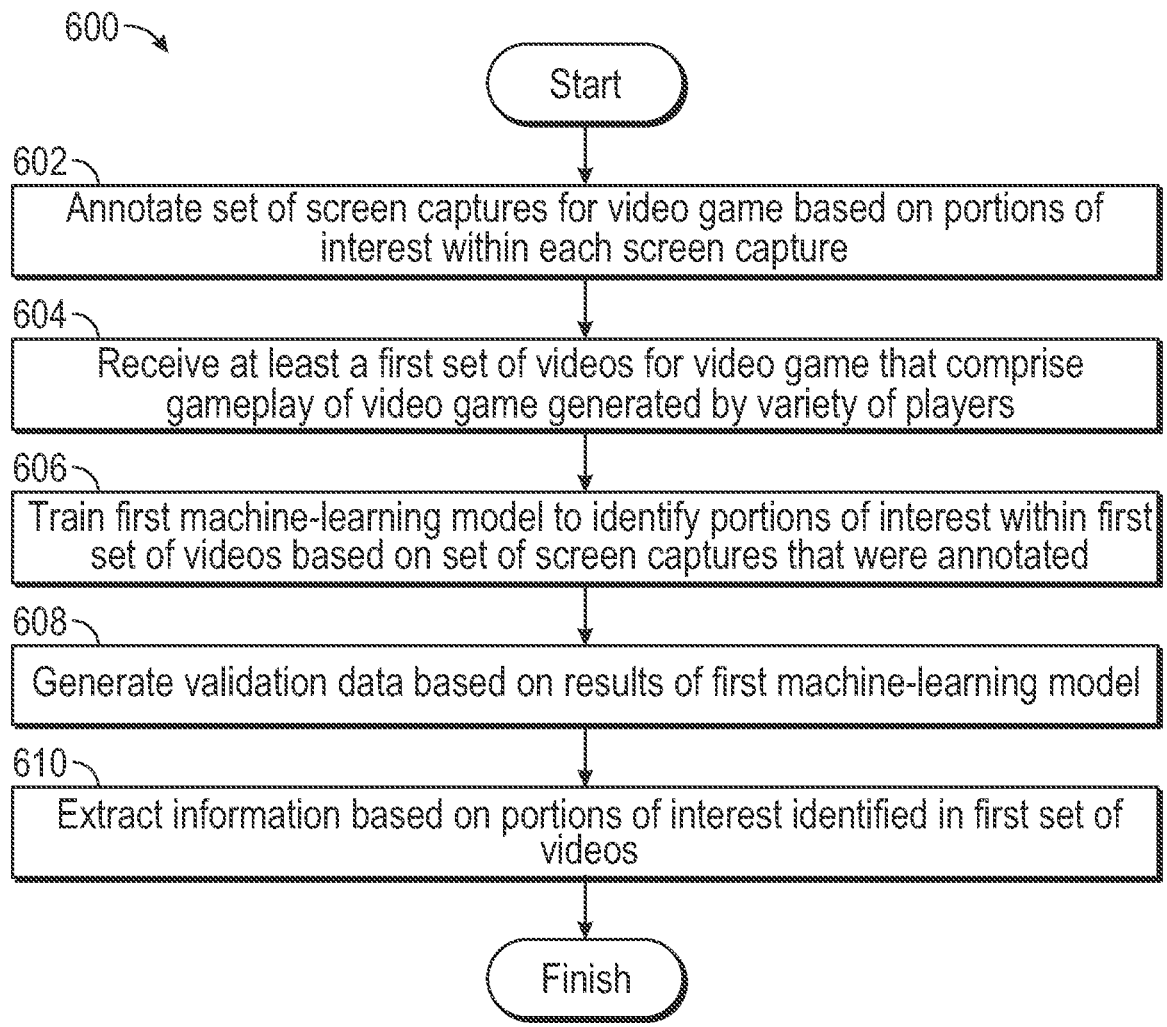
FIG. 6 illustrates an example flow diagram for extracting information from videos, according to certain aspects of the disclosure.

FIG. 6 illustrates an example flow diagram (e.g., process 600) for extracting information from videos, according to certain aspects of the disclosure. For explanatory purposes, the example process 600 is described herein with reference to FIGS. 1-4C. Further for explanatory purposes, the steps of the example process 600 are described herein as occurring in serial, or linearly. However, multiple instances of the example process 600 may occur in parallel. For purposes of explanation of the subject technology, the process 600 will be discussed in reference to FIGS. 1-4C.

At step 602, a set of screen captures for a video game is annotated based on portions of interest within each screen capture. At step 604 at least a first set of videos is received for the video game that comprise gameplay of the video game generated by a variety of players.

At step 606, a first machine-learning model is trained to identify the portions of interest within the first set of videos based on the set of screen captures that were annotated. At step 608, validation data is generated based on results of the first machine-learning model.

At step 610, information is extracted based on the portions of interest identified in the first set of videos.

For example, as described above in relation to FIGS. 1-4C, at step 602, a set of screen captures (e.g., training data 102) for a video game is annotated based on portions of interest 202 within each screen capture (e.g., as shown in FIGS. 2A-2D and FIGS. 3A and 3B). At step 604 at least a first set of videos (e.g., videos 112) is received for the video game that comprise gameplay of the video game generated by a variety of players. At step 606, a first machine-learning model 104 is trained to identify the portions of interest 202 within the first set of videos (e.g., videos 112) based on the set of screen captures (e.g., training data 102) that were annotated. At step 608, validation data 114 is generated based on results of the first machine-learning model 104. At step 610, information is extracted (e.g., by analyzer 110) based on the portions of interest 202 identified in the first set of videos.

According to an aspect the process 600 may further include receiving a second set of videos for the video game that comprise gameplay of the video game generated by a variety of players, the second set of videos being larger than the first set of videos. The process 600 may further include training a second machine-learning model to identify the portions of interest within the second set of videos based on the validation data. The process 600 may further include extracting information based on the portions of interest identified in at least the first set of videos and the second set of videos.

According to an aspect the process 600 may further include filtering the first set of videos based on the portions of interest. According to an aspect the process 600 may further include filtering a second set of videos based on the portions of interest.

According to an aspect the process 600 may further include annotating a subset of the first set of videos to identify the portions of interest, and verifying an accuracy of the first machine-learning model by comparing the subset of the first set of videos that were annotated with outputs of the first machine-learning model.

According to an aspect the process 600 may further include analyzing the information that was extracted from the first set of videos, and determining improvements to the video game based on the information that was analyzed. According to an aspect the process 600 may further include analyzing a second set of videos, and determining improvements to the video game based on the information that was analyzed.

According to an aspect the process 600 may further include compressing the first set of videos. According to an aspect the process 600 may further include compressing a second set of videos.

According to an aspect the process 600 may further include receiving a third set of videos for the video game that comprise gameplay of the video game generated by a variety of players, the third set of videos larger than the second set of videos, and training a third machine-learning model to identify the portions of interest within the third set of videos based on test data.

According to an aspect, the portions of interest comprise at least one of a rare item, a player reaction, a player rank, a username, or a custom skin.

Figure 7:
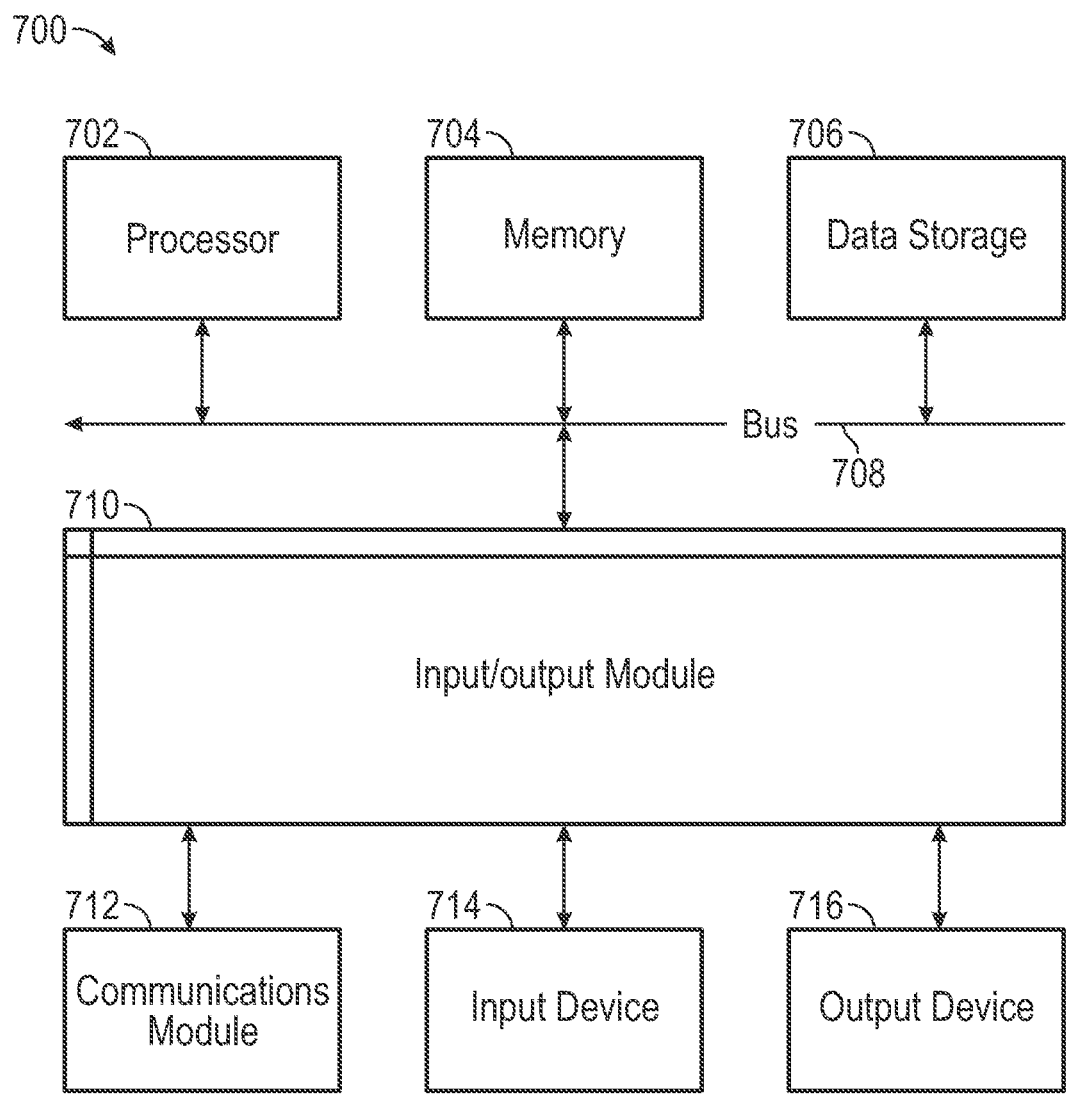
FIG. 7 is a block diagram illustrating an example computer system (e.g., representing both client and server) with which aspects of the subject technology can be implemented.

FIG. 7 is a block diagram illustrating an exemplary computer system 700 with which aspects of the subject technology can be implemented. In certain aspects, the computer system 700 may be implemented using hardware or a combination of software and hardware, either in a dedicated server, integrated into another entity, or distributed across multiple entities.

Computer system 700 (e.g., server and/or client) includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as an LCD (liquid crystal display) monitor, for displaying information to the user.

According to one aspect of the present disclosure, the above-described gaming systems can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 700 reads game data and provides a game, information may be read from the game data and stored in a memory device, such as the memory 704. Additionally, data from the memory 704 servers accessed via a network the bus 708, or the data storage 706 may be read and loaded into the memory 704. Although data is described as being found in the memory 704, it will be understood that data does not have to be stored in the memory 704 and may be stored in other memory accessible to the processor 702 or distributed among several media, such as the data storage 706.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for extracting information from videos, comprising:
    receiving a set of annotated screen captures comprising portions of interest within corresponding screen captures of a video game;
    receiving at least a first set of videos for the video game that comprise gameplay of the video game generated through interactions of one or more players with the video game;
    training a first machine-learning model to identify the portions of interest within the first set of videos based on the set of annotated screen captures;
    generating validation data based on results of the first machine-learning model;
    receiving a second set of videos for the video game that comprise gameplay of the video game generated by a variety of players, the second set of videos being larger than the first set of videos;
    training a second machine-learning model to identify the portions of interest within the second set of videos based on the validation data;
    extracting information based on the portions of interest identified in at least the first set of videos and the second set of videos; and
    extracting information based on the portions of interest identified in at least the first set of videos.

2. The computer-implemented method of claim 1, further comprising:
    receiving an annotated subset of the first set of videos to identify the portions of interest; and
    verifying an accuracy of the first machine-learning model by comparing the annotated subset of the first set of videos with outputs of the first machine-learning model.

3. The computer-implemented method of claim 1, further comprising:
    analyzing the information that was extracted from the first set of videos; and determining improvements to the video game based on the information that was analyzed.

4. The computer-implemented method of claim 1, further comprising:
compressing the first set of videos.

5. The computer-implemented method of claim 1, further comprising:
receiving a third set of videos for the video game that comprise gameplay of the video game generated by a variety of players, the third set of videos larger than the second set of videos; and
training a third machine-learning model to identify the portions of interest within the third set of videos based on test data.

6. The computer-implemented method of claim 1, wherein the portions of interest comprise at least one of a player reaction, a player rank, a username, or a custom skin.

7. A system for extracting information from videos, comprising: a processor; and
a memory comprising instructions stored thereon, which when executed by the processor, causes the processor to perform:
receiving a set of annotated screen captures comprising portions of interest within corresponding screen captures of a video game;
receiving at least a first set of videos for the video game that comprise gameplay of the video game generated through interactions of one or more players with the video game;
training a first machine-learning model to identify the portions of interest within the first set of videos based on the set of annotated screen captures;
generating validation data based on results of the first machine-learning model;
receiving a second set of videos for the video game that comprise gameplay of the video game generated by a variety of players, the second set of videos being larger than the first set of videos;
training a second machine-learning model to identify the portions of interest within the second set of videos based on the validation data; and
extracting information based on the portions of interest identified in at least the first set of videos and the second set of videos.

8. The system of claim 7, further comprising stored sequences of instructions, which when executed by the processor, cause the processor to perform:
receiving an annotated subset of the first set of videos to identify the portions of interest; and
verifying an accuracy of the first machine-learning model by comparing the annotated subset of the first set of videos with outputs of the first machine-learning model.

9. The system of claim 7, further comprising stored sequences of instructions, which when executed by the processor, cause the processor to perform:
analyzing the information that was extracted from the first set of videos; and
determining improvements to the video game based on the information that was analyzed.

10. The system of claim 7, further comprising stored sequences of instructions, which when executed by the processor, cause the processor to perform:
compressing the first set of videos.

11. The system of claim 7, further comprising stored sequences of instructions, which when executed by the processor, cause the processor to perform:
receiving a third set of videos for the video game that comprise gameplay of the video game generated by a variety of players, the third set of videos larger than the second set of videos; and
training a third machine-learning model to identify the portions of interest within the third set of videos based on test data.

12. The system of claim 7, wherein the portions of interest comprise at least one a player reaction, a player rank, a username, or a custom skin.

13. A non-transitory computer-readable storage medium comprising instructions stored thereon, which when executed by one or more processors, cause the one or more processors to perform operations for extracting information from videos, the operations comprising:
receiving a set of annotated screen captures comprising portions of interest within corresponding screen captures of a video game;
receiving at least a first set of videos for the video game that comprise gameplay of the video game generated through interactions of one or more players with the video game;
training a first machine-learning model to identify the portions of interest within the first set of videos based on the set of annotated screen captures;
generating validation data based on results of the first machine-learning model;
receiving a second set of videos for the video game that comprise gameplay of the video game generated by a variety of players, the second set of videos being larger than the first set of videos;
training a second machine-learning model to identify the portions of interest within the second set of videos based on the validation data; and
extracting information based on the portions of interest identified in at least the first set of videos and the second set of videos.

14. The computer-readable storage medium of claim 13, comprising further instructions which, when executed by the one or more processors, cause the one or more processors to perform operations comprising:
filtering the first set of videos based on the portions of interest.

15. The computer-readable storage medium of claim 13, comprising further instructions which, when executed by the one or more processors, cause the one or more processors to perform operations comprising:
receiving an annotated subset of the first set of videos to identify the portions of interest; and
verifying an accuracy of the first machine-learning model by comparing the annotated subset of the first set of videos with outputs of the first machine-learning model.

16. The computer-readable storage medium of claim 13, comprising further instructions which, when executed by the one or more processors, cause the one or more processors to perform operations comprising:
analyzing the information that was extracted from the first set of videos; and
determining improvements to the video game based on the information that was analyzed.

* * * * *